July 4, 1939.     W. C. HALL, JR     2,164,915
INDUCTION TIMER
Filed Dec. 8, 1936
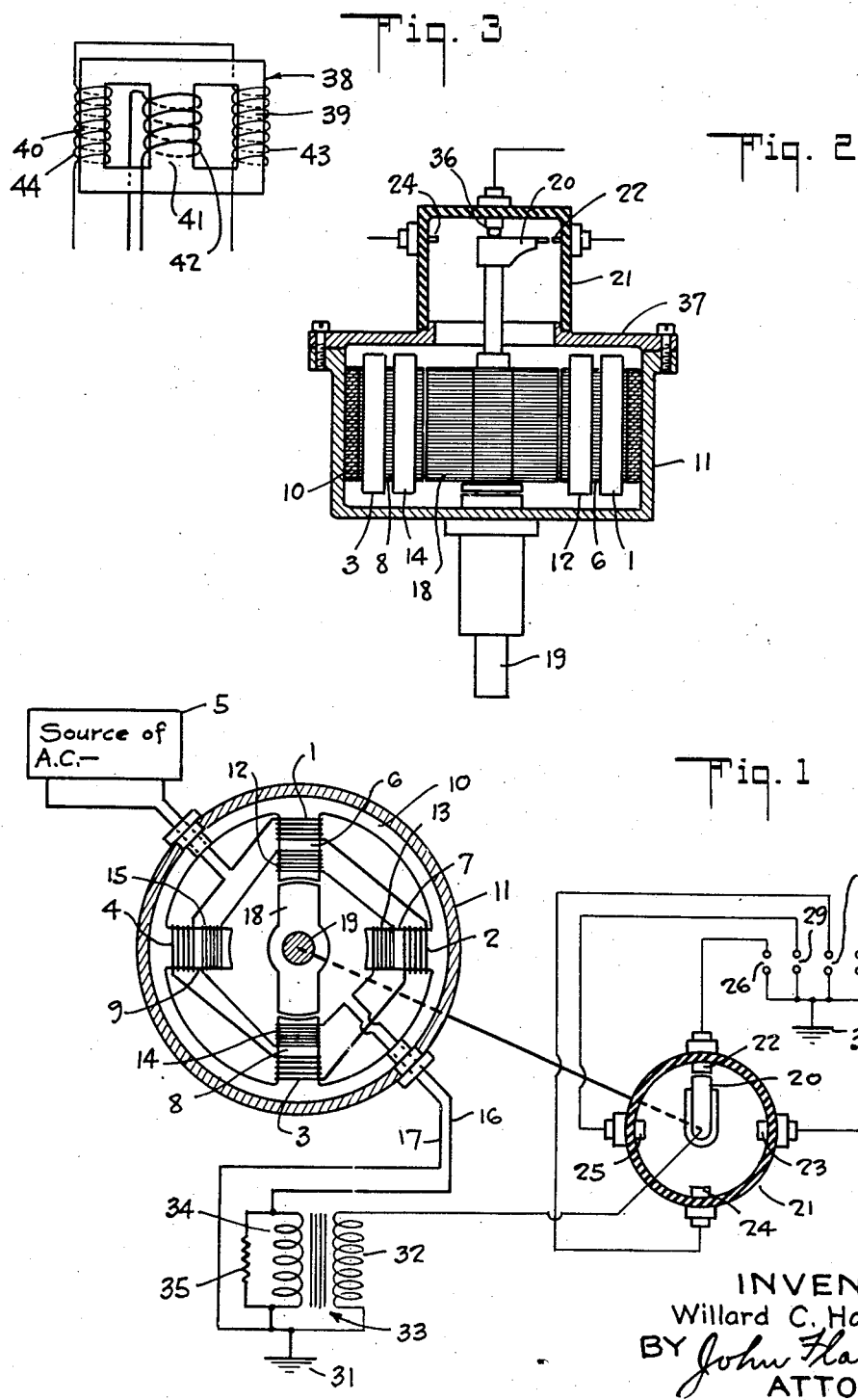
INVENTOR
Willard C. Hall, Jr.
BY John Ham
ATTORNEY Patented July 4, 1939

2,164,915

UNITED STATES PATENT OFFICE 2,164,915

INDUCTION TIMER

Willard C. Hall, Jr., Los Angeles, Calif., assignor to Thomas H. Hearn, Los Angeles, Calif.

Application December 8, 1936, Serial No. 114,828

9 Claims. (Cl. 171—252)

This invention relates to an induction timer; specifically such as may be used for producing a discharge of electricity in a definite sequence or cycle. Such a device among other purposes, may be used for ignition systems for internal combustion engines.

The device incorporates the use of transformer action between circuits, so arranged that the transfer of energy is controlled to take place at a series of spaced intervals.

It is one of the objects of this invention to make it possible to control the periodic transfer of energy without the aid of any breaking or making of a circuit.

It is another object of the invention to provide a system for alternating current energy transfer at intervals in which the overall efficiency of the system is improved.

It is still another object of this invention to provide a device of this character that is simple and inexpensive and yet reliable in operation.

This invention possesses many other advantages, and has other objects which may be made more easily apparent from a consideration of several embodiments of the invention. For this purpose there is shown a few forms in the drawing accompanying and forming part of the present specification. These forms will now be described in detail, illustrating the general principles of the invention; but it is to be understood that this detailed description is not to be taken in a limiting sense, since the scope of this invention is best defined by the appended claims.

Referring to the drawing:

Figure 1 is a diagrammatic representation of a system incorporating the invention;

Fig. 2 is a sectional view, mainly diagrammatic, of apparatus embodying the invention; and Fig. 3 is a diagrammatic illustration of an alternative form of step-up transformer for use with the invention.

The device includes a series of primary coils 1, 2, 3 and 4 connected to any appropriate source 5 of alternating current. These primary coils 1, 2, 3, and 4 are supported in the present instance on inwardly directed radial projections 6, 7, 8 and 9, formed on the magnetic annular core 10. This core 10 can be formed of a stack of laminations appropriately supported in a housing 11.

Cooperating respectively with the primary coils 1, 2, 3, and 4, are a series of secondary coils 12, 13, 14 and 15. These secondary coils are also connected in series. The transformer ratio between the primary and secondary coils may be chosen at any desired value, As thus far described, if it be assumed that the number of turns in each of the primary coils is the same, and the number of turns in each of the secondary coils is the same, then the electromotive force induced in the secondary coils may be caused to be neutralized in the series circuit 12, 13, 14 and 15 by appropriate choice of connection of the terminals of these secondary coils. It is apparent that for this purpose the number of projections, as well as the number of primary coils, and the number of secondary coils must be even; in the present instance, four primary coils and four secondary coils are shown, although any even number, no less than four, may be used. Furthermore, it is apparent that with this scheme of connections, the secondary circuit leads 16 and 17 will have no electromotive force across them, because of the neutralization of the electromotive forces induced in the secondary circuit.

However, in accordance with the invention, this neutralization is cyclically destroyed. This can be accomplished for example by introducing a magnetic member periodically into the magnetic circuit of alternate projections; such as for example between projections 6 and 8, or between projection 7 and 9. In the present instance, the magnetic member or armature 18 is indicated as mounted on a shaft 19 concentric with the annular core member 10. In the position shown in Fig. 1, the armature 18 is in a position to reduce the reluctance in the magnetic circuit of coils 1, 12, 14 and 3. The magnetic flux thus passes diametrically directly through the armature 18. The electromotive forces induced in coils 12 and 14 are much greater than when the armature 18 is out of alinement with the projections 6 and 8, and accordingly there is a resultant, unneutralized electromotive force across the leads 16 and 17. As the armature 18 continues its rotation, neutralization is again established when the armature reaches a position intermediate the projections. When the armature 18 assumes a horizontal position, there is an increase in the electromotive force generated in the secondary coils 13 and 15. In this position, therefore, an electromotive force is available at the leads 16 and 17.

It is thus apparent that for each 90° of rotation of the armature 18, there is a pulse of electromotive force corresponding to a transfer of energy at these alined positions of the armature 18. At intermediate positions of armature 18 there is substantial neutralization of the electromotive forces induced in the secondary coils, and no electromotive force is available across the leads 16 and 17.

This impulse timer is shown in the present instance as utilized for providing pulses of high potential current in a spark ignition system for an internal combustion engine. Thus for example the shaft 19 may be connected to be driven by the engine and in unison with the rotating arcing arm 20 of a distributor 21. The source of alternating current 5 may also be in the form of a generator coupled to the shaft 19, whereby the speed of the generator is proportional to the speed of the armature 18.

The distributor 21 is shown in this instance as provided for a four-cylinder engine having four equally spaced stationary contacts 22, 23, 24 and 25 leading respectively to the spark gaps 26, 27, 28 and 29, provided by conventional spark plugs. The grounded side 30 of the spark plugs connects through ground 31 to the secondary coil 32 of a high potential step-up transformer 33. The primary coil 34 of transformer 33 can be connected across the leads 16 and 17. A resistance 35 may be provided to bridge the coil 34 to match the impedance of the transformer 33 and of the timer mechanism 11.

It is apparent that as the shaft 19 rotates the transfer of energy between the primary and secondary circuits in the timer structure coincide in time with the positions of the arcing switch arm 20 in the distributor 21. For the particular position shown in Fig. 1, the spark gap 26 is active. The complete secondary circuit can be traced from ground 31, coil 32, contact button 36 (Fig. 2), arm 20, contact 22, spark gap 26 and ground 30.

As shown most clearly in Fig. 2, the distributor body 21 may be secured to the cover 37 of the body 11 and arm 20 may be mounted directly upon the shaft 19.

The mode of operation is clear from the foregoing. As the engine rotates, armature 18 and arcing arm 20 of the distributor 21 move in unison to cause a transfer of energy between the primary and secondary circuits of the timer at the time when the distributor arm is in alinement with any one of the stationary contacts 22, 23, 24 or 25. This synchronous operation exists irrespective of the speed of the shaft 19.

Figure 3 illustrates a step-up, high potential transformer 38, which may be substituted for the conventional type of transformer 33 shown in Fig. 1. Transformer 38 has a split secondary leg consisting of the two parts 39 and 40, with a leg 41 disposed between them to receive the primary winding 42. Secondary windings 43 and 44 are placed on 39 and 40, and connected in series, the direction of the windings and the connections being such that the E. M. F. induced in each coil is additive. The primary 42 is connected to leads 16 and 17 in the same manner as the primary 34 of Fig. 1, and the leads from the secondaries are connected to the distributor and ground, as in that figure. By this design of transformer, it is possible to provide a core of large size for the secondary winding, at the same time maintaining a balanced and symmetrical design. The large amount of iron reduces the saturation at high frequencies; therefore the magnetic leakage is reduced, keeping the reactance low.

What is claimed is:

1. In a device of the character described, a magnetic core, a plurality of primary coils carried by the core, a plurality of secondary coils also carried by the core, said secondary coils being so connected that the electromotive forces induced in some of the coils oppose those induced in other of the coils, and movable magnetic means for cyclically altering the electromotive forces induced in the secondary coils.

2. In a device of the character described, a magnetic core, a plurality of primary coils carried by the core, a plurality of secondary coils also carried by the core, said secondary coils being so connected that the electromotive forces induced in some of the coils oppose those induced in other of the coils, so that the induced electromotive forces substantially neutralize when the magnetic circuit is formed only by the core, and movable magnetic means cooperating with the core cyclically to unbalance said neutralization.

3. In a device of the character described, an annular core having a series of projecting pole pieces, a primary coil as well as a secondary coil on each core, said secondary coils being so connected that the electromotive forces in adjacent coils oppose each other, and a rotatable armature for cyclically reducing the reluctance of the magnetic path through at least some of those coils which are in assisting relation.

4. In a device of the character described, an annular core having a series of projecting pole pieces, a series of primary coils, respectively disposed over the pole pieces and arranged to produce a magnetomotive force in the same direction with respect to alternate pole pieces, a series of secondary coils, respectively disposed over the pole pieces and so connected that alternate coils on alternate pole pieces assist each other and all of the induced electromotive forces substantially neutralize when the magnetic circuit is formed only by the core, and means for cyclically reducing the magnetic reluctance through alternate pole pieces.

5. In a device of the character described, an annular core having a series of projecting pole pieces, a series of primary coils, respectively disposed over the pole pieces and arranged to produce a magnetomotive force in the same direction with respect to alternate pole pieces, a series of secondary coils, respectively disposed over the pole pieces and so connected that alternate coils on alternate pole pieces assist each other and all of the induced electromotive forces substantially neutralize when the magnetic circuit is formed only by the core, and a rotatable armature bridging in progression, the alternate pole pieces to reduce cyclically the magnetic reluctance through alternate pairs of coils.

6. In a device of the character described, an annular core having a series of projecting pole pieces, a primary coil as well as a secondary coil on each core, said secondary coils being so connected that the electromotive forces in adjacent coils oppose each other, a rotatable armature for cyclically reducing the reluctance of the magnetic path through at least some of those coils which are in assisting relation, and a source of alternating current connected to the primary coils and having a rotor rotated at a speed proportional to the speed of the armature.

7. In a device of the character described, an annular core having a series of projecting pole pieces, a series of primary coils, respectively disposed over the pole pieces and arranged to produce a magnetomotive force in the same direction with respect to alternate pole pieces, a series of secondary coils, respectively disposed over the pole pieces and so connected that alternate coils on alternate pole pieces assist each other and all of the induced electromotive forces substantially neutralize when the magnetic circuit is formed only by the core, a rotatable armature bridging in progression, alternate pole pieces to reduce cyclically the magnetic reluctance through alternate pairs of coils, and a source of alternating current connected to the primary coils and having a rotor rotated at a speed proportional to the speed of the armature.

8. In a device of the character described, an annular core having a series of projecting pole pieces, a series of primary coils, respectively disposed over the pole pieces and arranged to produce a magnetomotive force in the same direction with respect to alternate pole pieces, a series of secondary coils, respectively disposed over the pole pieces and so connected that alternate coils on alternate pole pieces assist each other and the induced electromotive forces of each secondary coil are equal and substantially neutralize each other when the magnetic circuit is formed only by the core, and means for cyclically reducing the magnetic reluctance through alternate pole pieces.

9. In a device of the character described, a magnetic core having a series of projections, a primary coil on each projection, a secondary coil on each projection, all of the primary coils being so connected in series that alternate projections have opposite magnetic polarities, and the primary coils having all substantially the same number of turns, the secondary coils being also connected in series and having the same number of turns, the connections being such that electromotive forces in the adjacent secondary coils oppose each other, there being an even number of projections and coils, whereby when the magnetic core is not supplemented by other magnetic members, the electromotive force in the secondary coil circuit is substantially neutralized, and a moving magnetic member for cyclically reducing the magnetic reluctance through the path of the alternate projections and thereby to unbalance the secondary circuit.

WILLARD C. HALL, Jr.